M. LEITCH.
MILKING MACHINE CLUSTER.
APPLICATION FILED MAR. 1, 1917.

1,255,186.

Patented Feb. 5, 1918.

WITNESS:

INVENTOR
Meredith Leitch
ATTORNEY

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE CLUSTER.

1,255,186.   Specification of Letters Patent.   Patented Feb. 5, 1918.

Application filed March 1, 1917. Serial No. 151,681.

*To all whom it may concern:*

Be it known that I, MEREDITH LEITCH, a citizen of the United States, residing at Poughkeepsie, county of Dutchess, and State of New York, have invented a new and useful Improvement in Milking-Machine Clusters, of which the following is a full, clear, and exact description, reference being had to the accompanying drawings, which form a part of this specification.

My invention relates to clusters or claws of milking machines and particularly to those adapted for use with teat cups each of which has two chambers: an inner chamber to receive the teat and which is connected with the milk pail and a source of suction; and an outer or inflation chamber which receives pneumatic pulsations, preferably by alternately connecting the same with atmosphere and with a partial vacuum.

The type of cluster or claw to which my invention is more particularly applicable comprises a milk chamber or passage with four inlets and one outlet and two independent pulsation chambers or passages each adapted to be connected with a source or sources of pneumatic pulsations, one of said pulsation chambers or passages being also connected with the outer or inflation chambers of two teat cups and the other of said pulsation chambers or passages being also connected with the outer or inflation chambers of the other two teat cups. Examples of this type of cluster are disclosed in the patent to Charles R. Mitchell, No. 1,018,846, February 27, 1912; the patent to Meredith Leitch, No. 1,195,997, August 29, 1916; and the application of Robert B. Forsyth, Serial No. 820,851, filed February 25, 1914: the two last named constructions also disclosing a pneumatically operated pulsator in the claw adapted to connect the said pulsation chambers or passages alternately with suction and with the atmosphere. The invention, however, is also applicable to clusters of certain other types.

The object of my invention is to provide a cluster or claw, preferably of the specific type mentioned, which, from the standpoint of simplicity and ease of manufacture and assemblage, certainty of operation and the readiness with which the parts may be dissociated and cleaned, exhibit decided advantages over those heretofore known. Thus, the milk passages need frequent thorough cleaning. In the Mitchell cluster, the milk passages are formed in one member which is attached, by a screw, to another member containing the pulsation passages, which do not need such frequent cleaning. In my invention, improved means are provided for connecting these two members. Again, the milk passage, the pulsation valve chamber, the pulsation passages, the milk tubes and the pulsation tubes, while exhibiting some features in common with those of the Leitch patent and the Forsyth application hereinbefore named, are constructed and relatively arranged in a new manner presenting substantial advantages and also coöperating with, or forming part of, the means whereby the two elements of the claw or cluster may be readily separated.

In the accompanying drawings, which show a preferred embodiment of the invention:—

Figure 1:
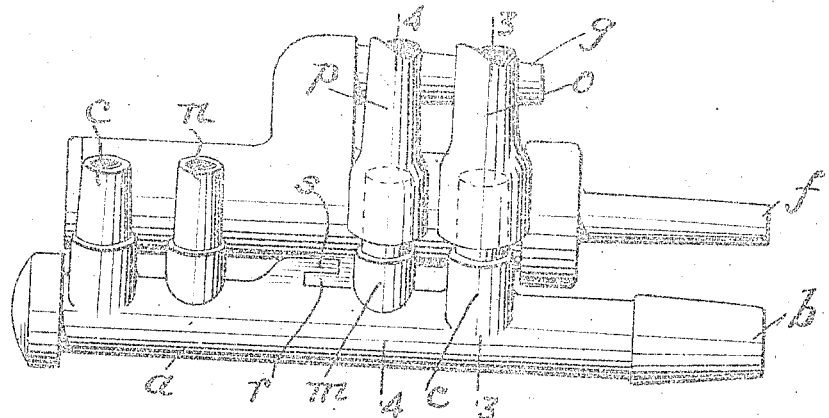
Figure 1 is a side view of the cluster.
Figure 2:
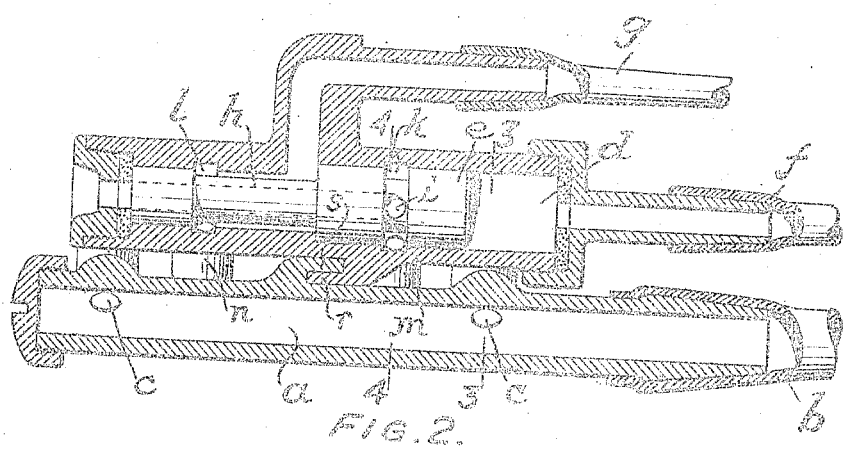
Fig. 2 is a longitudinal section of the same.
Figure 3:
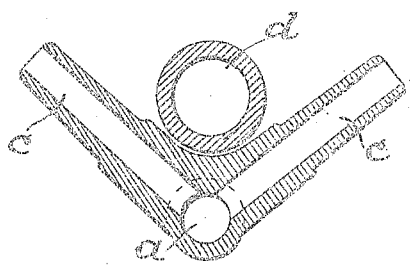
Fig. 3 is a cross section on the lines 3—3 of Figs. 1 and 2.
Figure 4:
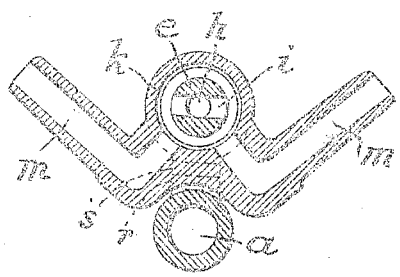
Fig. 4 is a cross section on the lines 4—4 of Figs. 1 and 2.

$a$ is the milk member of the cluster and has a milk passage having one end adapted to be connected by a flexible tube $b$ to a milk pail (not shown), there being four branch tubes $c$ adapted, by means of flexible tubes $o$, to be connected to the several teat chambers of four teat cups. $d$ is a valve chamber in the pulsation member of the cluster and contains a valve $e$, which is caused to reciprocate by pneumatic pulsations from the pipe $f$. The pipe $g$ is to be connected to a source of continuous suction.

The valve $e$ is provided with a passage $h$ extending along its longitudinal center or axis and a cross hole $i$. Within the valve chamber $d$ are formed two annular chambers or passages $k$ and $l$. Two tubes $m, m,$ are connected with the valve chamber and in communication with the annular chamber $k$, the two tubes being connected, by flexible tubes $p$, with the inflation chambers of two of the teat cups. Two tubes $n, n,$ are connected with the valve chamber and in communication with the annular chamber $l$, the two tubes being connected, by flexible tubes (not shown) similar to tubes $p$, with the inflation chambers of the other two teat cups of the set. With the valve *e* in the position shown, air at atmospheric pressure enters through the hole *h* in the center of the valve and the cross hole *i* to the annular chamber *k* and its connected tubes *m*, *m*. At the same time air is exhausted through the pipe *g* and the space around the small diameter central part of the valve *e* from the annular chamber *l* and its two connected tubes *n*, *n*. With the valve *e* at the other extremity of its movement, atmospheric pressure can pass directly to the chamber *l* and chamber *k* will be in communication with pipe *g*.

From the above it is readily seen that the valve *e* serves as a source of pneumatic pulsations for the two annular chambers *k* and *l*, each of which has two branches each adapted to be connected with the pulsation chamber of a teat cup.

On the under side of the pulsation member and on the top of the milk member are mating hooks *r* and *s* adapted to coengage and hold the two members together. These hooks may be disengaged by moving the pulsation member to the right. When the cluster is assembled with the teat cups, the flexible tubes *o* and *p* on the tubes *c* and *m* (and *c* and *n*) prevent the longitudinal movement required to disengage the hooks *m* and *n*.

The tubes *c* of the milk member extend on opposite sides of said member in an upwardly inclined direction; and the milk member is shaped, adjacent the tubes *c*, to conform to the pulsation member. The tubes *m*, *m* (and *n*, *n*) of the pulsation member are elbow-shaped and extend on opposite sides of said member first in a downwardly inclined direction and thence in an upwardly inclined direction; and the pulsation member is shaped, adjacent the tubes *m* and *n*, to conform to the milk member. These adjustments to shape serve to hold the members in alinement.

Having now fully described my invention, what I desire to claim and protect by Letters Patent is:

1. A milking machine cluster comprising a milk member having a milk passage, a separable pulsation member having a valve chamber, tubes adapted for connection with the inflation chambers of double chamber teat cups supported by the pulsation member and communicating with the valve chamber, tubes adapted for connection with the teat chambers of double chamber teat cups supported by the milk member and communicating with the milk passage, and a valve in the valve chamber.

2. A milking machine cluster comprising a milk member having a milk passage, a separable pulsation member having a valve chamber, tubes adapted for connection with the inflation chambers of double chamber teat cups supported by the pulsation member and communicating with the valve chamber, tubes adapted for connection with the teat chambers of double chamber teat cups supported by the milk member and communicating with the milk passage, a pulsation pipe connected with the valve chamber and adapted to transmit pneumatic pulsations to control the operation of the valve hereinafter mentioned, a suction pipe connected with the valve chamber, and a valve in the valve chamber adapted to connect each of the tubes communicating therewith alternately with the suction pipe and atmosphere.

3. A milking machine cluster comprising a milk member having a milk passage, a pulsation member having a valve chamber, tubes adapted for connection with the teat chambers of double chamber teat cups supported by the milk member and communicating with the milk passage, tubes adapted for connection with the inflation chambers of double chamber teat cups supported by the pulsation member and communicating with the valve chamber, and coacting means on said members engageable and separable by longitudinal movement.

4. A milking machine cluster comprising a pulsation member and a milk member, branch tubes on each member, coacting hooks on said members engageable by movement longitudinally in one direction, and flexible tubes detachably engaging said branch tubes and adapted to prevent longitudinal movement of said members in the opposite direction.

5. A milking machine cluster comprising a pulsation member and a milk member, branch tubes on each member, means to maintain an approximate parallelism of the two members, coacting hooks on said members engageable by longitudinal movement in one direction and flexible tubes detachably engaging said branch tubes, and adapted to prevent longitudinal movement in the other direction.

6. A milking machine cluster comprising a milk member having a milk passage, a pulsation member having a valve chamber, tubes adapted for connection with the teat chambers of double chamber teat cups supported by the milk member and communicating with the milk passage, tubes adapted for connection with the inflation chambers of double chamber teat cups supported by the pulsation member and communicating with the valve chamber, each of said members adjacent its respective tubes being shaped to conform to the other member, thereby maintaining them in substantially parallel alinement.

7. A milking machine cluster comprising a milk member having a milk passage, a pulsation member having a valve chamber, tubes adapted for connection with the teat chambers of double chamber teat cups supported by the milk member and communicating with the milk passage, tubes adapted for connection with the inflation chambers of double chamber teat cups supported by the pulsation member and communicating with the valve chamber, and coacting means on said members engageable and separable by longitudinal movement, each of said members adjacent its respective tubes being shaped to conform to the other member.

8. A milking machine cluster comprising a milk member provided with a milk passage having an outlet adapted to be connected with a milk pail and inlets adapted to be connected with the teat chambers of teat cups, a pulsation member provided with a pulsation passage having an outlet adapted to be connected with a source of pneumatic pulsations and inlets adapted to be connected to the pulsation chambers of teat cups, means to maintain approximate parallelism of said milk member and pulsation member, coacting devices on said members adapted to be engaged by longitudinal movement in one direction, and means to prevent movement in the other direction.

9. A milking machine cluster comprising a milk member having a milk passage, a pulsation member having a valve chamber and located above and in substantial parallelism with the milk member, milk tubes extending from and on opposite sides of the milk member and shaped to conform to the pulsation member, and elbow-shaped pulsation tubes extending from and on opposite sides of the pulsation member and shaped to conform to the milk member.

10. A milking machine cluster comprising a milk member having a milk passage, a pulsation member having a valve chamber and located above and in substantial parallelism with the milk member, milk tubes extending from and on opposite sides of the milk member and shaped to conform to the pulsation member, elbow-shaped pulsation tubes extending from and on opposite sides of the pulsation member and shaped to conform to the milk member, and coacting means on said members engageable and separable by longitudinal movement.

11. A milking machine cluster comprising a milk member, a pulsation member having a longitudinally extending valve chamber of two diameters, a two diameter reciprocating valve in the pulsation member, the smaller end of the valve chamber being open to the atmosphere, a pulsation pipe connected with the larger end of the valve chamber, a suction pipe connected with the valve chamber between its ends, said valve having an axial air passage open at the smaller end of the valve and a cross port communicating with the axial passage in the larger section of the valve, tubes adapted for connection with the inflation chambers of double chamber teat cups and supported by the pulsation member and communicating with the smaller and larger sections respectively of the valve chamber, said milk member extending longitudinally of and parallel with the pulsation chamber and provided with a milk passage extending parallel with the valve chamber, and tubes adapted for connection with the teat chambers of double chamber teat cups and supported by the milk member and communicating with said longitudinally extending milk passage.

In testimony of which invention, I have hereunto set my hand, at Poughkeepsie, on this 26th day of February, 1917.

MEREDITH LEITCH.